May 7, 1940.          E. W. TAYLOR          2,199,470
                       PUSHER CAR
                  Filed May 23, 1938          3 Sheets-Sheet 1
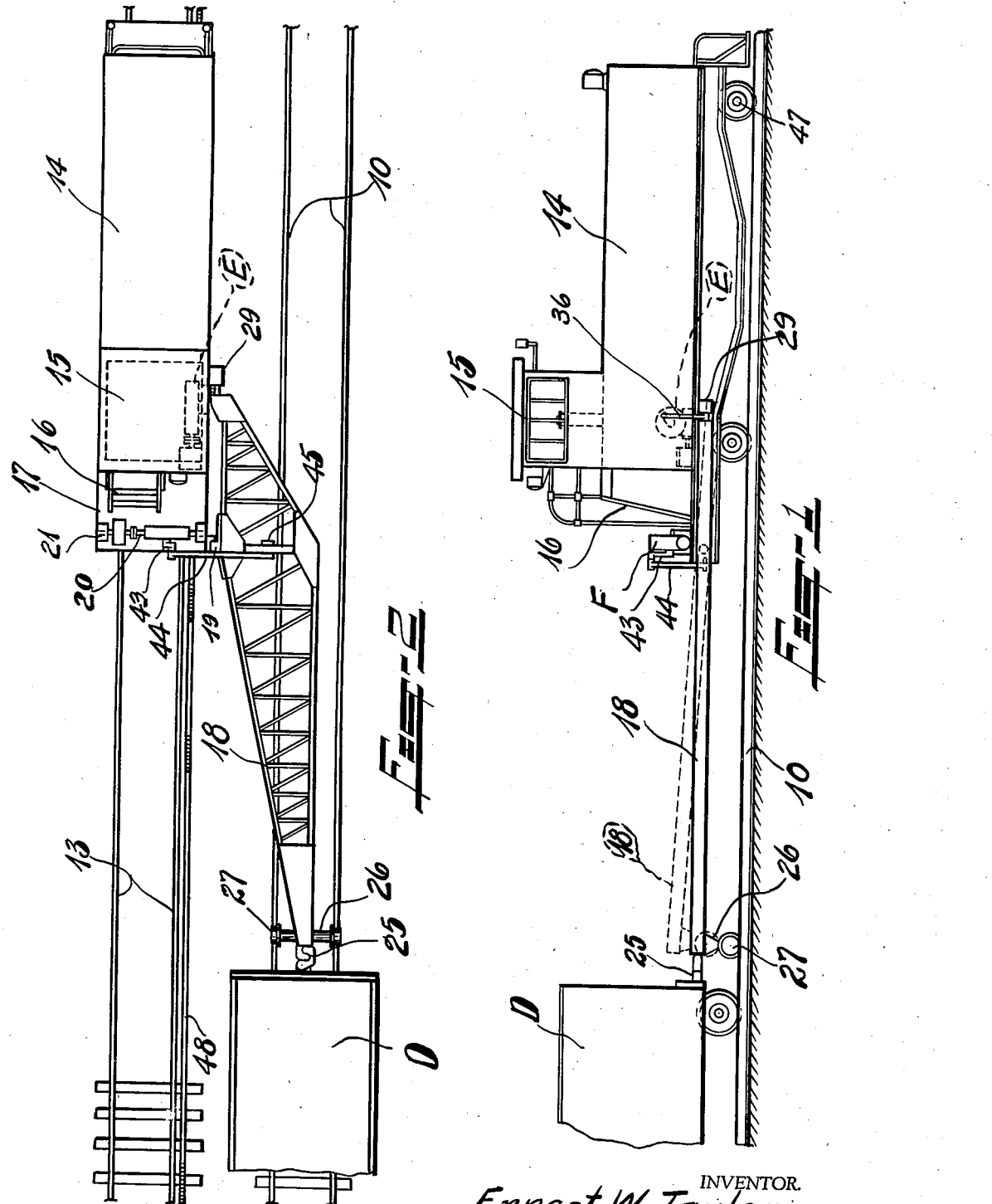

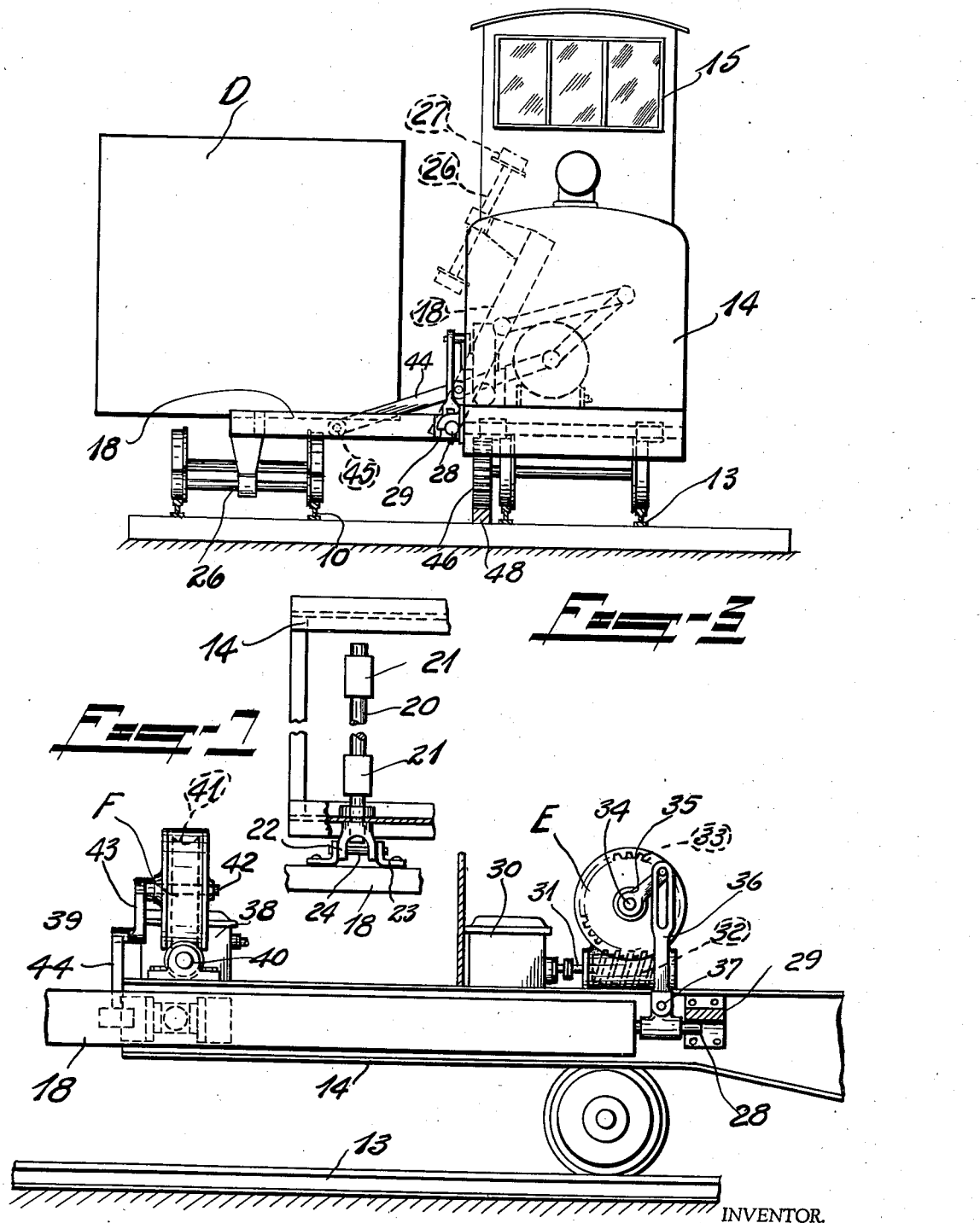

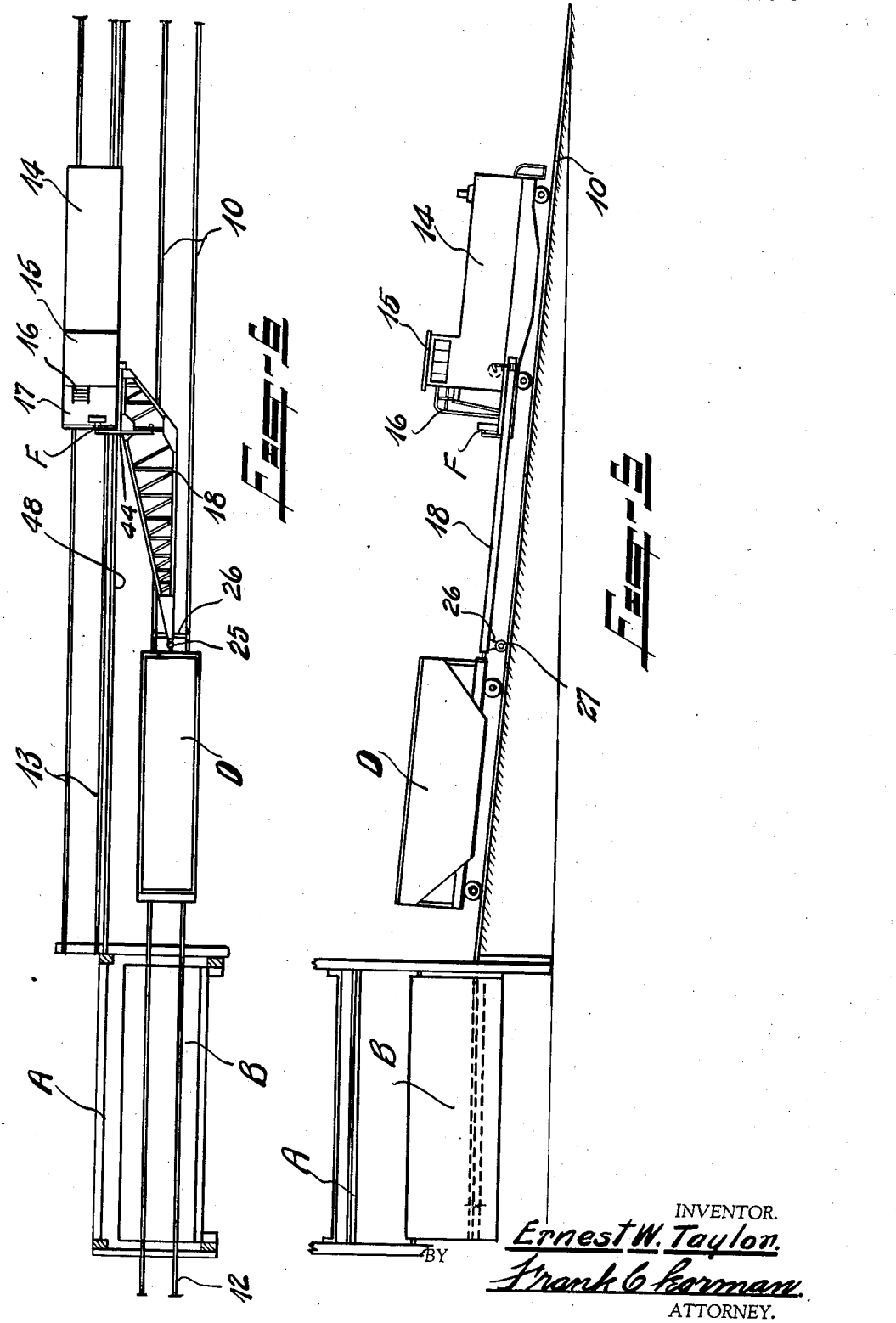

Patented May 7, 1940

2,199,470

UNITED STATES PATENT OFFICE 2,199,470

PUSHER CAR

Ernest W. Taylor, Bay City, Mich., assignor to The Industrial Brownhoist Corp., Bay City, Mich., a corporation of Michigan Application May 23, 1938, Serial No. 209,589

6 Claims. (Cl. 105—29)

This invention relates to a pusher car and system for use in connection with car handling apparatus, such as car dumpers to bring the loaded cars up on to the dumper cradle and generally up along an inclined approach track leading thereto.

Car dumpers are usually provided with a car haulage system or plant including a small haulage car operative on a narrow gage track between the rails of the main track. This haulage track terminates in a pit into which the haulage car is adapted to be lowered, so that the loaded car can be "spotted" or brought up to position, such that when the haulage car is drawn from the pit by the haulage cables, it will be at the rear of the loaded car or in position to push said loaded car up the inclined approach to the car dumper.

A haulage system of this type is expensive to build, install and maintain, in that it requires a pit, a house and engine, foundations for same, an operator's house, main cables, tail cables and springs, conduits and ducts in the foundation, and a retarding mechanism on the cradle of the car dumper in order that the loaded car may be properly "spotted" thereon. These cables sometimes break, releasing the loaded car, which runs uncontrolled down the inclined approach, smashing the haulage car and colliding with other cars. Sometimes the ram of the haulage car becomes entangled with the brake mechanism of the loaded car with consequent breakage and expense, and the system is otherwise dangerous to both life and property, and all of this is eliminated in my improved system, which eliminates the pit, engine house, operator's house, cables, etc., and by means of which the loaded cars are positively controlled, being pushed up the inclined approach and accurately "spotted" on the cradle, thus eliminating the retarding mechanism on the dumper cradle in addition thereto the operator has clear and unobstructed vision not possible with the haulage system above referred to, and the entire system is very simple, practical, and economical.

My invention may be further summarized as consisting in certain novel constructions, combinations, and arrangement of parts, hereinafter more fully described, and more particularly pointed out in the appended claims.

In the accompanying drawings:

Fig. 1 is a side elevational view of my pusher car and track arrangement.

Fig. 2 is a top plan view thereof.

Fig. 3 is a rear view, the broken lines showing the pusher arm swung up to inoperative position.

Fig. 4 is an enlarged fragmentary part sectional side elevational view of the pusher car.

Fig. 5 is a side elevational view of a car dumper, trackage, loaded car, and pusher car, and Fig. 6 is a top plan view thereof.

Fig. 7 is a fragmentary part sectional plan view illustrating the connection of the pusher arm to the car.

In the drawings in which I have shown the preferred embodiment of my invention, the ordinal A indicates a car dumper of conventional design including a cradle B on which a loaded car is "spotted," preparatory to lifting it upwardly in the dumper for tilting it to discharge the car contents into a hopper, the hold of a vessel, or other receptacle (not shown).

An inclined approach track 10 leads to the car dumper, and these tracks are in alignment with the tracks 11 provided on the cradle B, so that the car readily rolls thereon, a track 12 leading from the opposite side of the dumper to a pick-back (not shown) for disposal of the empty cars after they have been dumped; and I shall show and describe only that part of the trackage or system which is necessary in order to gain a clear understanding of the "work" to be accomplished and the manner of accomplishment.

Standard gauge tracks 13 parallel the tracks 10, and both of these tracks may form a part of and connect with the trackage on which loaded cars are placed, and which are switched to the track 10 by a yard locomotive (not shown), or the tracks may be so inclined that the loaded cars roll by gravity when the brakes are released.

A pusher car 14 is adapted for travel on any standard gauge track, but more particularly for travel on the track 13 which leads to the dumper. This car is provided with a power plant (not shown), and this power plant can be either gasoline, electric, or steam, and is operated by an engineer as usual, and I shall not describe this pusher car in detail as it can be constructed and powered in any desired manner.

An operator's house 15 is provided on the pusher car, and a stairway 16 leads from the platform 17 to the said house which is raised so that the operator has a full, clear, unobstructed view of the trackage, dumper, etc. A preferably fabricated pusher arm 18 is hingedly connected to the side of the haulage car at the point 19, and is so constructed and arranged as to be capable of swinging to one position such that it may engage and move a car on the adjacent track, and in another position such that it may be swung over the pusher car so that said pusher car may pass loaded cars on the adjacent track without engaging or interference with same. A transversely disposed shaft 20 is journaled in bearings 21 provided on the pusher car, one end of said shaft being bifurcated as at 22 and a lug 23 is provided on the pusher arm, a pin 24 providing a pivotal connection between the pusher arm and the car, this shaft providing for the swinging of the pusher arm about an axis at right angles to the tracks on which the pusher car is operating, and in a manner to be presently described.

A standard coupling 25 is provided on the outer end of the pusher arm for coupling to a loaded car D and the outer end of the arm is supported on a standard gauge, swiveled truck 26, the wheels 27 of which travel on the main tracks 10, and this coupling is of standard design and must be manually released when it is desired to uncouple from the car.

A shaft 28 is provided on the inner end of the pusher arm, and a socket 29 is provided on the side wall of the pusher car and into which the end of the shaft 28 projects, said socket being open on its under side, so that it rotates and has limited vertical movement thereon.

After a loaded car has been pushed up the approach track 10 and "spotted" on the dumper cradle, the pusher car must reverse its direction of travel to move to position to engage the next car to move it to position to be dumped, consequently, it must pass one or more loaded cars, and the pusher arm is, therefore, arranged to swing inboard over the side of the pusher car and clear of the main tracks as clearly shown in broken lines in Fig. 3 of the drawings. This swinging movement can be accomplished in various ways, and in the present construction I have shown a mechanism E which is releasably connected to the main power plant (not shown) of the pusher car and which includes a reducer 30 which is mounted on the pusher car, the shaft 31 of which projects beyond the reducer, and a worm 32 is mounted on said shaft, meshing with and driving a worm wheel 33 which is mounted on the shaft 34, this worm and worm wheel being mounted in a housing as usual. A crank 35 is mounted on the shaft 34, and one end of a link 36 is pivotally connected to the end of the crank, the opposite end of the link being pivotally connected to the pusher arm at the point 37, so that when the mechanism is actuated this pusher arm can be swung down to operative position as shown in Fig. 1 of the drawings or upwardly to inoperative position as shown in Fig. 3 of the drawings.

The pusher arm is of considerable length, and this together with the truck, creates a considerable overhang when the arm is being swung to inoperative position, and I therefore, provide a mechanism F, which includes a reduction unit 38 with a worm 39 on the shaft 40, a worm wheel 41 meshing with said worm and is mounted on a shaft 42 as usual, said worm and worm wheel being mounted in a housing in the conventional manner. A crank 43 is mounted on the shaft 42, and one end of a link 44 is pivotally connected to the crank, the opposite end of the link being pivotally connected to the rear end of pusher arm 18 at the point 45, this mechanism being actuated to counterbalance the overhang of the arm above referred to.

Now, when it is desired to swing the arm to inoperative position, the mechanism E is first actuated so that the link 36 exerts a downward pressure on the rear end of the arm so that the shaft 20 rotates in the bearings 21 thus counterbalancing the overhang of the arm, the mechanism F is then actuated so that the arm is swung upwardly and over to position as clearly shown in broken lines in Fig. 3 of the drawings. When it is desired to swing the arm to operative position, the operator actuates the mechanism F so that the arm is swung over and downwardly until the link 44 is free, and the truck wheels rest on the track 10 with the end of the pusher arm against the shoe 29, the arm is then coupled to a loaded car, which is then pushed up the inclined approach track and onto the dumper cradle, pushing the empty car onto the track 12 and accurately "spotting" the loaded car on the cradle, the coupling is then released, the direction of travel of the pusher car is reversed, and the arm 18 is then swung upwardly to inoperative position, so that it readily passes loaded cars on the adjacent tracks.

The pusher car can be driven in any desired manner, and to prevent slippage I provide a gear 46 which I mount on one end of the drive axle 47, said gear meshing with the rack 48 which is disposed in spaced relation with the track 13, thus providing a positive drive.

From the foregoing description, it will be clearly obvious that I have perfected a very simple, practical and inexpensive haulage car and arrangement for handling cars, etc.

What I claim is:

1. In a car haulage system, a pusher car adapted to operate on a standard gauge railroad track and including a horizontally disposed forwardly projecting pusher arm pivotally connected at a point intermediate its length to the side of the car and having a standard gauge truck on the outer free end thereof, means for swinging said arm about said pivoting point on an axis parallel to the railroad track to place said arm and truck in operative position on an adjacent standard gauge railroad track, said means being also operative to swing said arm and truck upwardly to position entirely within the right of way limits of the railroad track on which the pusher car is operating.

2. In a car haulage system, a pusher car adapted to operate on a standard gauge railroad track and including a forwardly projecting pusher arm pivotally mounted on the side of the pusher car and provided with a standard car coupling on the outer free end thereof, a standard gauge wheeled truck pivotally mounted on the pusher arm for supporting the free end thereof, and adapted to engage and travel on the rails of an adjacent track when the pusher arm is in operative position, and means for swinging said pusher arm and truck upwardly and over about an axis parallel to the standard gauge track, so that it lies entirely within the right of way limits of the track on which the pusher car is operating.

3. In a car haulage system, a pusher car adapted to travel on a standard gauge railroad track and including a horizontally disposed forwardly projecting pusher arm pivotally mounted on the side of the pusher car and provided with a standard railroad car coupling on the outer free end thereof, and adapted to be coupled to a standard railroad car, a standard gauge truck mounted on and supporting the free end of said pusher arm for travel on the rails of an adjacent track when the pusher arm is in operative position, and means on said pusher car and connected to said arm for swinging it upwardly about an axis parallel to the railroad track to position and entirely into the right of way limits of the track on which the pusher car is operating.

4. In a car haulage system, a pusher car adapted to travel on a standard gauge railroad track and including a horizontally disposed, forwardly projecting pusher arm hingedly connected to the side of the pusher car and having a standard car coupling on its outer free end, which coupling is engageable with the coupling of a railroad car located on the rails of an adjacent track when the pusher arm is in operative position, means on the pusher car and spaced rearwardly from the hinging point for releasably engaging the rear end of the pusher arm to form a guide and bumper for said arm, and driving means on said pusher car and connected to said arm for swinging it upwardly about an axis parallel to the tracks on which the pusher car is operating and to position entirely within the right of way limits of the track on which the pusher car is operating.

5. In a car haulage system, a pusher car adapted to travel on a standard gauge railroad track and including a forwardly projecting pusher arm hingedly and revolvably secured to the side of the pusher car, a standard gauge railroad truck forming a part of the pusher arm and adapted to travel on an adjacent standard gauge track when the pusher arm is in operative position, an open socket on the pusher car and spaced from the hinging point for loosely and revolvably engaging the rear end of the pusher arm, driving means engageable with the pusher arm at a point adjacent the hinging point for swinging it about an axis parallel to the standard gauge railroad tracks and the socket and to position within the right of way limits of the track on which the pusher car is operating, and means on said pusher car and connected to the rear end of said pusher arm for swinging it about an axis at right angles to said tracks for counterbalancing said arm when it is being swung to inoperative position.

6. In a car haulage system, a pusher car adapted to operate on a standard gauge railroad track and including a forwardly projecting pusher arm hingedly and revolvably mounted at a point intermediate its length to the side of the pusher car and provided with a standard gauge wheeled truck on the outer free end thereof, said wheeled truck supporting the free end of said arm for travel on the rails of an adjacent track when the pusher arm is in operative position, means for swinging said arm and truck about an axis parallel to the standard gauge track to bring it entirely within the right of way limits of the track on which the pusher car is operating, and means on said pusher car for engaging the rear end of said pusher arm for swinging it about an axis at right angles to the standard gauge track to counterbalance said arm when it is being swung to inoperative position.

ERNEST W. TAYLOR.